(12) United States Patent
Otoi et al.

(10) Patent No.: US 9,368,072 B2
(45) Date of Patent: Jun. 14, 2016

(54) IMAGE DISPLAY DEVICE AND IMAGE DISPLAY METHOD OF A MULTI-DISPLAY TYPE WITH LOCAL AND GLOBAL CONTROL

(75) Inventors: Katsuya Otoi, Osaka (JP); Katsuteru Hashimoto, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 115 days.

(21) Appl. No.: 14/000,262

(22) PCT Filed: Mar. 22, 2012

(86) PCT No.: PCT/JP2012/057282
§ 371 (c)(1),
(2), (4) Date: Aug. 19, 2013

(87) PCT Pub. No.: WO2012/133084
PCT Pub. Date: Oct. 4, 2012

(65) Prior Publication Data
US 2013/0321498 A1 Dec. 5, 2013

(30) Foreign Application Priority Data

Mar. 29, 2011 (JP) .................................. 2011-072286

(51) Int. Cl.
*G09G 3/34* (2006.01)
*G09G 3/36* (2006.01)
(Continued)

(52) U.S. Cl.
CPC ............ *G09G 3/3426* (2013.01); *G09G 3/3406* (2013.01); *G09G 3/3611* (2013.01);
(Continued)

(58) Field of Classification Search
CPC ... G09G 3/3406; G09G 3/342; G09G 3/3426; G09G 3/3611; G09G 2300/026; G09G 2320/0233; G09G 2320/0271; G09G 2320/0686; G09G 2360/04; G09G 2360/16; G02F 1/13336; G02F 1/133603; G02F 2001/133601; G02F 3/1423; G02F 3/1446
USPC .................................. 345/1.3, 102, 690, 694
See application file for complete search history.

(56) References Cited

U.S. PATENT DOCUMENTS 8,280,184 B2 * 10/2012 Chen ....................... G06T 5/007
382/274
8,681,087 B2 * 3/2014 Otoi et al. ..................... 345/102
(Continued)

FOREIGN PATENT DOCUMENTS

| JP | 2004-226513 A | 8/2004 |
| JP | 2007-322944 A | 12/2007 |
| WO | 2010/041504 A1 | 4/2010 |

OTHER PUBLICATIONS

Official Communication issued in International Patent Application No. PCT/JP2012/057282, mailed on Apr. 17, 2012.

*Primary Examiner* — Keith Crawley
(74) *Attorney, Agent, or Firm* — Keating & Bennett, LLP

(57) ABSTRACT

Control sections of displays 11 each determine control information Pi used when area-active driving is performed individually and transmit the control information Pi to a multi-display control section 12. The multi-display control section 12 determines control information Ps for the entire device on the basis of the received pieces of control information Pi and transmits the control information Ps to the control sections of the displays 11. All the displays 11 perform area-active driving on the basis of the same control information Ps. In this way, occurrence of a luminance difference or chromaticity difference among display screens of the displays 11 is prevented and the quality of a displayed image is improved.

14 Claims, 11 Drawing Sheets

(51) Int. Cl.
*G02F 1/1333* (2006.01)
*G02F 1/1335* (2006.01)

(52) U.S. Cl.
CPC ....... *G02F1/13336* (2013.01); *G02F 1/133603* (2013.01); *G02F 2001/133601* (2013.01); *G09G 2300/026* (2013.01); *G09G 2360/16* (2013.01)

(56) References Cited

U.S. PATENT DOCUMENTS

| | | | |
|---|---|---|---|
| 2004/0217918 A1* | 11/2004 | Ando et al. | 345/1.1 |
| 2005/0184952 A1* | 8/2005 | Konno et al. | 345/102 |
| 2007/0103599 A1* | 5/2007 | Wen-Chin | 348/687 |
| 2007/0296689 A1* | 12/2007 | Kimura et al. | 345/102 |
| 2008/0024517 A1* | 1/2008 | Kerofsky | 345/600 |
| 2008/0180384 A1* | 7/2008 | Aoki et al. | 345/102 |
| 2009/0009456 A1* | 1/2009 | Ohshima | 345/89 |
| 2009/0085862 A1* | 4/2009 | Takaku et al. | 345/102 |
| 2009/0284545 A1* | 11/2009 | Watanabe et al. | 345/589 |
| 2010/0073276 A1* | 3/2010 | Koike et al. | 345/102 |
| 2010/0201716 A1* | 8/2010 | Tanizoe et al. | 345/690 |
| 2010/0225574 A1* | 9/2010 | Fujiwara et al. | 345/102 |
| 2010/0328336 A1* | 12/2010 | Si | 345/589 |
| 2011/0095965 A1* | 4/2011 | Yoneoka et al. | 345/1.1 |
| 2011/0141077 A1* | 6/2011 | Cho et al. | 345/207 |
| 2011/0141166 A1* | 6/2011 | Ahn et al. | 345/691 |
| 2011/0157262 A1 | 6/2011 | Fujiwara et al. | |
| 2011/0181565 A1* | 7/2011 | Asamura et al. | 345/207 |
| 2012/0105507 A1* | 5/2012 | An et al. | 345/690 |

\* cited by examiner

FIG. 7A
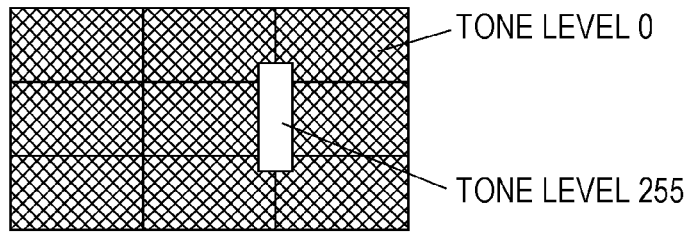
FIG. 7B
| 0 | 128 | 128 |
|---|-----|-----|
| 0 | 128 | 128 |
| 0 | 128 | 128 |
FIG. 7C
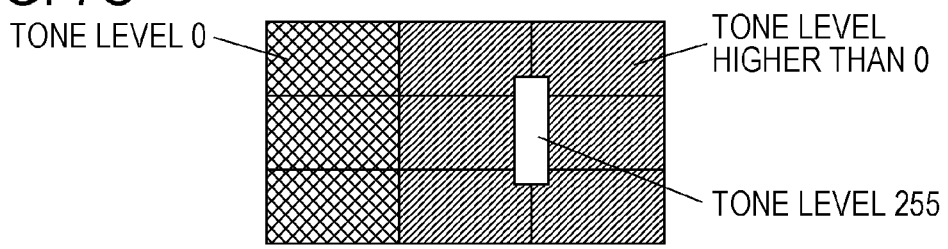
FIG. 7D
| 128 | 128 | 128 |
|-----|-----|-----|
| 128 | 128 | 128 |
| 128 | 128 | 128 |
FIG. 7E
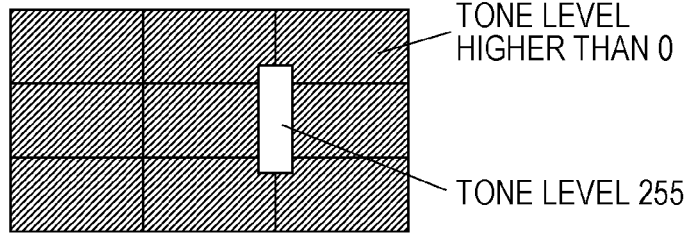

FIG. 11A
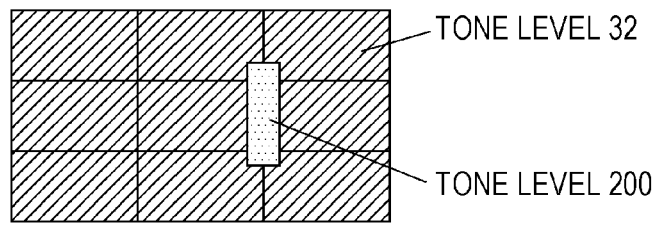
FIG. 11B
| 1 | 1.2 | 1.2 |
|---|-----|-----|
| 1 | 1.2 | 1.2 |
| 1 | 1.2 | 1.2 |
FIG. 11C
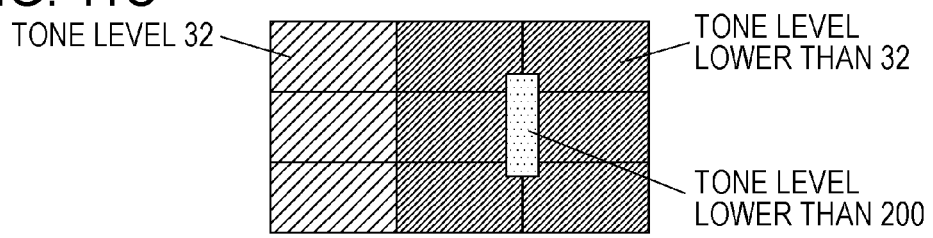
FIG. 11D
| 1.2 | 1.2 | 1.2 |
|-----|-----|-----|
| 1.2 | 1.2 | 1.2 |
| 1.2 | 1.2 | 1.2 |
FIG. 11E
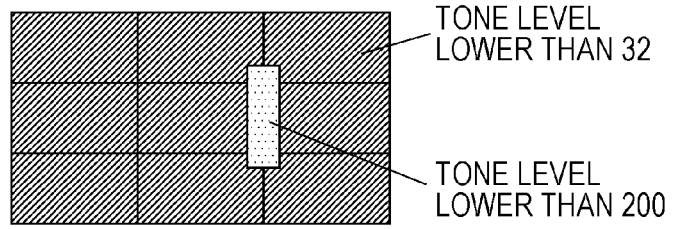

FIG. 14

PRIOR ART

| D1 | D2 | D3 |
|----|----|----|
| D4 | D5 | D6 |
| D7 | D8 | D9 |

IMAGE DISPLAY DEVICE AND IMAGE DISPLAY METHOD OF A MULTI-DISPLAY TYPE WITH LOCAL AND GLOBAL CONTROL

TECHNICAL FIELD

The present invention relates to image display devices and image display methods and, more particularly, to an image display device and image display method of multi-display type.

BACKGROUND ART

In recent years, in order to implement a large display screen, image display devices of multi-display type (hereinafter, referred to as multi-display devices) in which display screens of multiple displays are sequentially arranged have been put to practical use. FIG. 14 is a diagram illustrating an example of a display screen of a multi-display device. The display screen illustrated in FIG. 14 is constituted by sequentially arranging display screens of nine displays D1 to D9, three in each of the vertical and horizontal directions. In this way, the size of the display screen can be made three times larger than the size of the original display in the vertical and horizontal directions. Such multiple-display devices can be used, for example, to introduce products at stores, to display guidance information at public space such as stations or airports, as video display devices of high-definition videoconference systems, or the like.

Besides this, for image display devices equipped with a backlight, a method for driving a display panel while controlling luminance of the backlight on the basis of an image to be displayed in each of a plurality of areas defined by dividing a display screen (hereinafter, referred to as area-active driving) is known as a method for reducing power consumption of the backlight and improving the quality of a displayed image. For example, PTL 1 discloses that a luminance ratio between rays of three primary colors is controlled individually for each light-source block in accordance with a chromaticity signal detected from a video signal in an image display device that performs area-active driving.

CITATION LIST

Patent Literature

PTL 1: Japanese Unexamined Patent Application Publication No. 2007-322944

SUMMARY OF INVENTION

Technical Problem

The use of displays that perform area-active driving so as to constitute a multi-display device permits a reduction in power consumption of backlights. However, when display screens of multiple displays are just sequentially arranged without any special configurations, a luminance difference or chromaticity difference occurs among the display screens, decreasing the quality of an image displayed on a display screen of the multi-display device.

Accordingly, the present invention aims to improve the quality of an image displayed on an image display device of multi-display type that performs area-active driving.

Solution to Problem

According to a first aspect of the present invention, an image display device of multi-display type includes:

a plurality of image display sections each including a display panel, a backlight, and a local control section configured to perform area-active driving; and a global control section configured to transmit and receive control information to and from the local control sections, wherein:

the local control sections each determine local control information and transmit the local control information to the global control section, the local control information being control information used when area-active driving is performed individually, the global control section determines global control information on the basis of the pieces of local control information received from the local control sections and transmits the global control information to the local control sections, the global control information being control information for the entire device, and the local control sections each operate on the basis of the global control information received from the global control section.

According to a second aspect of the present invention, in the first aspect of the present invention, the local control information and the global control information each include information related to control of luminance of the backlight.

According to a third aspect of the present invention, in the second aspect of the present invention, the local control information and the global control information each include a lowest emission luminance compensation value which indicates the lowest luminance of light to be emitted by the backlight, and the local control sections each correct luminance of light to be emitted by the backlight on the basis of the lowest emission luminance compensation value received from the global control section.

According to a fourth aspect of the present invention, in the third aspect of the present invention, the global control section transmits, to the local control sections, the maximum value among the lowest emission luminance compensation values received from the local control sections.

According to a fifth aspect of the present invention, in the third aspect of the present invention, the local control sections each determine, on the basis of an average luminance level of an input image, the lowest emission luminance compensation value to be transmitted to the global control section.

According to a sixth aspect of the present invention, in the first aspect of the present invention, the local control information and the global control information each include information related to control of light transmittance of the display panel.

According to a seventh aspect of the present invention, in the sixth aspect of the present invention, the local control information and the global control information each include a clipping scale value which indicates a degree of clipping that occurs in display data for use in driving of the display panel, and the local control sections each determine the display data on the basis of the clipping scale value received from the global control section.

According to an eighth aspect of the present invention, in the seventh aspect of the present invention, the global control section transmits, to the local control sections, the maximum value among the clipping scale values received from the local control sections.

According to a ninth aspect of the present invention, in the seventh aspect of the present invention, the local control sections each determine, on the basis of temporary display data based on an input image, the clipping scale value to be transmitted to the global control section.

According to a tenth aspect of the present invention, in the first aspect of the present invention, the local control information and the global control information each include both information related to control of luminance of the backlight and information related to control of light transmittance of the display panel.

According to an eleventh aspect of the present invention, in the tenth aspect of the present invention, the local control information and the global control information each include both a lowest emission luminance compensation value which indicates the lowest luminance of light to be emitted by the backlight and a clipping scale value which indicates a degree of clipping that occurs in display data for use in driving of the display panel, and the local control sections each correct luminance of light to be emitted by the backlight on the basis of the lowest emission luminance compensation value received from the global control section and determine the display data on the basis of the clipping scale value received from the global control section.

According to a twelfth aspect of the present invention, an image display method of multi-display type using a plurality of image display sections each including a display panel, a backlight, and a local control section; and a global control section, includes:

a step of, with each of the local control sections, determining local control information and transmitting the local control information to the global control section, the local control information being control information used when area-active driving is performed individually;

a step of, with the global control section, determining global control information on the basis of the pieces of local control information received from the local control sections and transmitting the global control information to the local control sections, the global control information being control information for the entire device; and a step of, with each of the local control sections, performing area-active driving on the basis of the global control information received from the global control section.

Advantageous Effects of Invention

According to the first or twelfth aspect of the present invention, the local control sections included in the image display sections perform area-active driving on the basis of the global control information determined by the global control section. In this way, area-active driving can be performed on the basis of the same control information in all the image display sections. Accordingly, occurrence of a luminance difference or chromaticity difference among display screens of the image display sections can be prevented and the quality of an image displayed on the image display device of multi-display type can be improved.

According to the second aspect of the present invention, the local control sections control luminances of the backlights on the basis of the global control information determined by the global control section. In this way, luminances of the backlights can be controlled on the basis of the same control information in all the image display sections. Accordingly, occurrence of a luminance difference or chromaticity difference among display screens of the image display sections due to a difference in backlight luminance control can be prevented and the quality of an image displayed on the image display device of multi-display type can be improved.

According to the third aspect of the present invention, the local control sections correct luminances of light to be emitted by the backlights on the basis of the lowest emission luminance compensation value determined by the global control section. In this way, the lowest luminances of light to be emitted by the backlights can be made equal in all the image display sections. Accordingly, occurrence of a luminance difference or chromaticity difference among display screens of the image display sections due to a difference between the lowest luminances of light to be emitted by the backlights can be prevented and the quality of an image displayed on the image display device of multi-display type can be improved.

According to the fourth aspect of the present invention, the global control section can determine the lowest emission luminance compensation value with which halo (a phenomenon in which a part of a display screen becomes brighter than it is supposed to be) becomes less conspicuous, on the basis of the lowest emission luminance compensation values determined by the local control sections.

According to the fifth aspect of the present invention, the local control sections can determine preferable lowest emission luminance compensation values on the basis of average luminance levels of input images.

According to the sixth aspect of the present invention, the local control sections control light transmittances of the display panels on the basis of the global control information determined by the global control section. In this way, light transmittances of the display panels can be controlled on the basis of the same control information in all the image display sections. Accordingly, occurrence of a luminance difference or chromaticity difference among display screens of the image display sections due to a difference in control of light transmittances of the display panels can be prevented and the quality of an image displayed on the image display device of multi-display type can be improved.

According to the seventh aspect of the present invention, the local control sections determine display data for use in driving of the display panels on the basis of the clipping scale value determined by the global control section. In this way, the display data can be determined using the same clipping scale value in all the image display sections. Accordingly, occurrence of a luminance difference or chromaticity difference among display screens of the image display sections due to a difference between the clipping scale values can be prevented and the quality of an image displayed on the image display device of multi-display type can be improved.

According to the eighth aspect of the present invention, the global control section can determine the clipping scale value with which clipping is less likely to occur, on the basis of the clipping scale values determined by the local control sections.

According to the ninth aspect of the present invention, the local control sections can determine the clipping scale values, on the basis of temporary display data based on input images.

According to the tenth aspect of the present invention, the local control sections control luminances of the backlights and light transmittances of the display panels on the basis of the global control information determined by the global control unit. In this way, luminances of the backlights can be controlled on the basis of the same control information and light transmittances of the display panels can be controlled on the basis of the same control information in all the image display sections. Accordingly, occurrence of a luminance difference or chromaticity difference among display screens of the image display sections due to a difference in backlight luminance control and in control of light transmittances of the display panels can be prevented and the quality of an image displayed on the image display device of multi-display type can be further improved.

According to the eleventh aspect of the present invention, the local control sections correct luminances of light to be emitted by the backlights on the basis of the lowest emission luminance compensation value determined by the global control section and determine display data on the basis of the clipping scale value determined by the global control section. In this way, the lowest emission luminances of the backlights can be made equal and display data can be determined using the same clipping scale value in all the image display sections. Accordingly, occurrence of a luminance difference or chromaticity difference among display screens of the image display sections due to a difference between the lowest emission luminances of the backlights and the clipping scale values can be prevented and the quality of an image displayed on the image display device of multi-display type can be further improved.

BRIEF DESCRIPTION OF DRAWINGS

FIG. 7A is a diagram for describing an advantageous effect provided by the multi-display device illustrated in FIG. 1.

FIG. 7B is a diagram that follows FIG. 7A.

FIG. 7C is a diagram that follows FIG. 7B.

FIG. 7D is a diagram that follows FIG. 7C.

FIG. 7E is a diagram that follows FIG. 7D.

FIG. 11A is a diagram for describing an advantageous effect provided by the multi-display device illustrated in FIG. 8.

FIG. 11B is a diagram that follows FIG. 11A.
FIG. 11C is a diagram that follows FIG. 11B.
FIG. 11D is a diagram that follows FIG. 11C.
FIG. 11E is a diagram that follows FIG. 11D.

Figure 14:
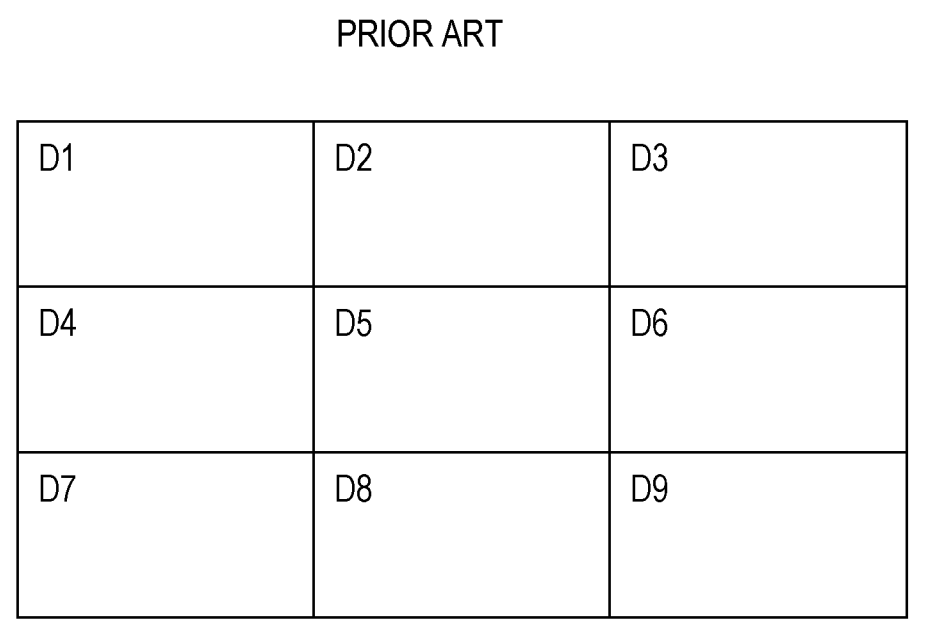

FIG. 14 is a diagram illustrating an example of a display screen of a multi-display device.

DESCRIPTION OF EMBODIMENTS

First Embodiment

Figure 1:
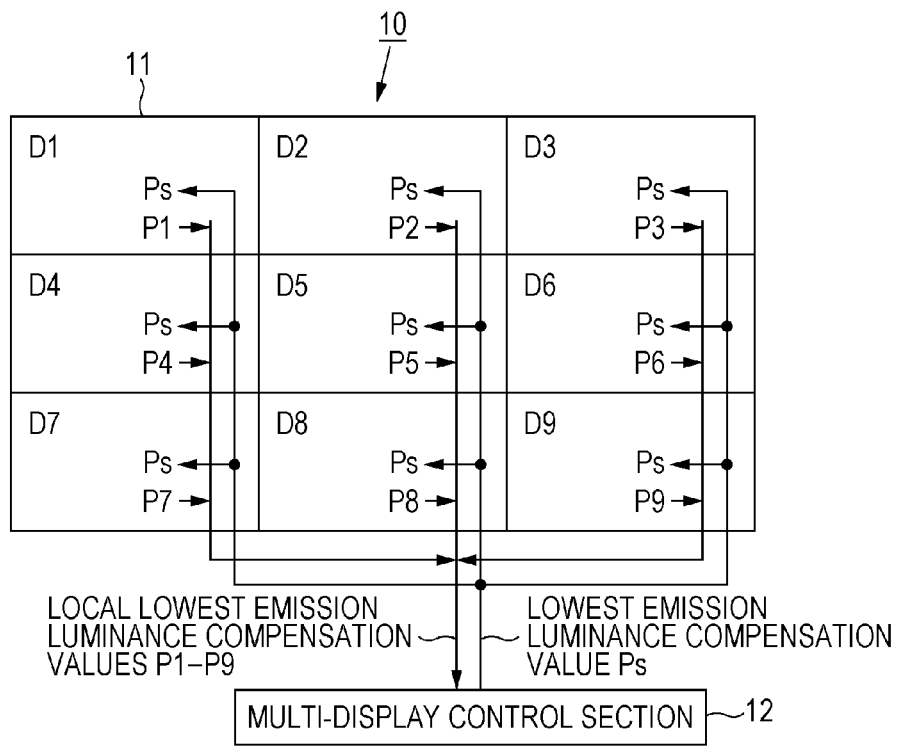
FIG. 1 is a block diagram illustrating the configuration of a multi-display device according to a first embodiment of the present invention.

FIG. 1 is a block diagram illustrating the configuration of a multi-display device according to a first embodiment of the present invention. A multi-display device 10 illustrated in FIG. 1 includes nine displays 11 and a multi-display control section 12. Each of the displays 11 includes a display screen (hereinafter, referred to as a unit screen) and displays an image on the unit screen. The nine unit screens are sequentially arranged, three in each of the vertical and horizontal directions. In this way, a display screen (hereinafter, referred to as an entire screen) of the multi-display device 10 is formed. The following describes a multi-display device including multiple liquid crystal displays by way of example. Note that the number of displays included in a multi-display device may be any value that is greater than or equal to 2.

Figure 2:
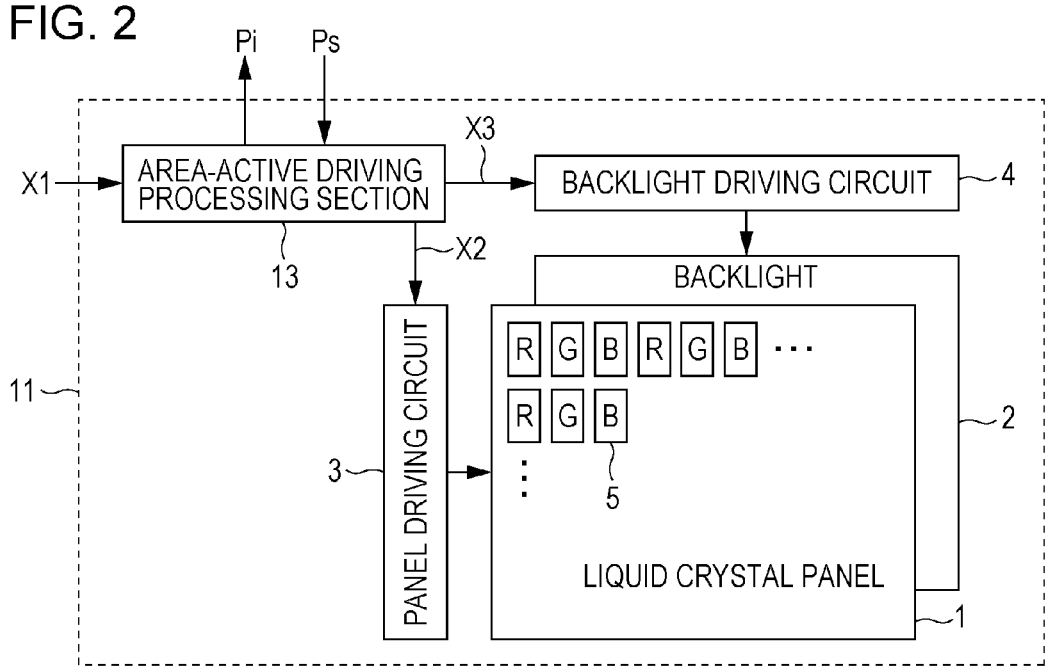
FIG. 2 is a block diagram illustrating the configuration of a display included in the multi-display device illustrated in FIG. 1.

FIG. 2 is a block diagram illustrating the configuration of the display 11. As illustrated in FIG. 2, the display 11 includes a liquid crystal panel 1, a backlight 2, a panel driving circuit 3, a backlight driving circuit 4, and an area-active driving processing section 13. The display 11 performs area-active driving in which the liquid crystal panel 1 is driven with luminance of the backlight being controlled on the basis of an image to be displayed in each of a plurality of areas defined by dividing the unit screen. In the following, m, n, p, and q are integers that are greater than or equal to 2, whereas i is an integer that is greater than or equal to 1 and is less than or equal to 9.

Input image data X1 which contains R image data, G image data, and B image data is input to the display 11. Each of the R image data, the G image data, and the B image data contains (m×n) pieces of data representing display tone levels. On the basis of the input image data X1, the area-active driving processing section 13 determines liquid crystal data X2 for use in driving of the liquid crystal panel 1 and LED data X3 for use in driving of the backlight 2.

The liquid crystal panel 1 includes (3m×n) display elements 5. The display elements 5 are two-dimensionally arranged as a whole, 3m display elements on each row (in the horizontal direction in FIG. 2) and n display elements on each column (in the vertical direction in FIG. 2). The display elements 5 include R, G, B display elements that respectively let red, green, and blue light pass therethrough. The R display elements, the G display elements, and the B display elements are sequentially arranged in the row direction so that each set of elements of three kinds forms one pixel.

The panel driving circuit 3 is a circuit for driving the liquid crystal panel 1. On the basis of the liquid crystal data X2 output by the area-active driving processing section 13, the panel driving circuit 3 outputs signals (voltage signals) for controlling light transmittances of the display elements 5 to the liquid crystal panel 1. The voltages output by the panel driving circuit 3 are written to pixel electrodes (not illustrated) in the display elements 5, and the light transmittances of the display elements 5 change in accordance with the voltages written to the pixel electrodes.

Figure 3:
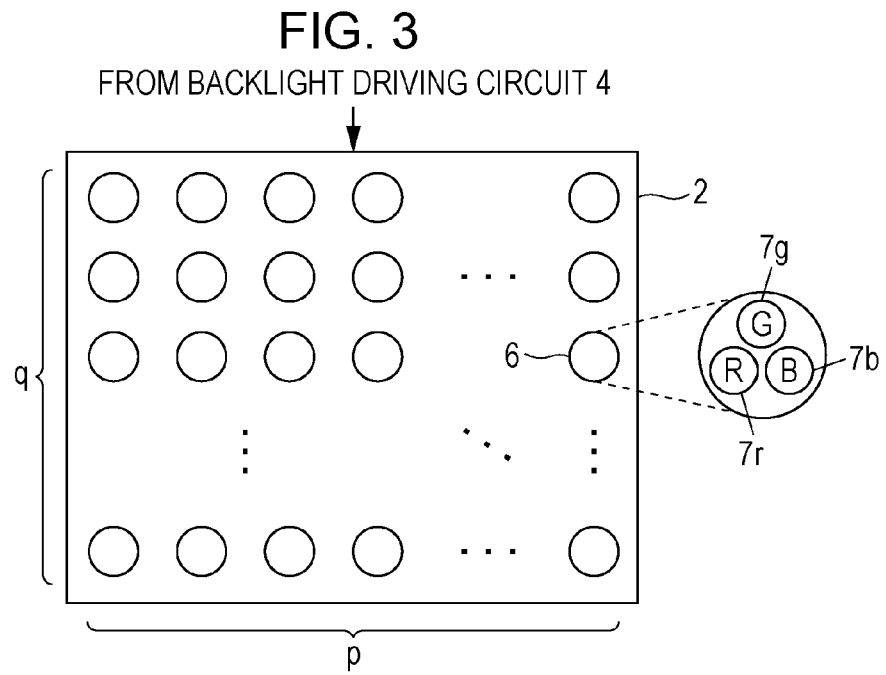
FIG. 3 is a diagram illustrating details of a backlight included in the multi-display device illustrated in FIG. 1.

The backlight 2 is provided on the back side of the liquid crystal panel 1 and radiates light to the back side of the liquid crystal panel 1. FIG. 3 is a diagram illustrating details of the backlight 2. As illustrated in FIG. 3, the backlight 2 includes (p×q) LED (Light Emitting Diode) units 6. The LED units 6 are two-dimensionally arranged as a whole, p LED units in the row direction and q LED units in the column direction. Each of the LED units 6 includes one red LED 7r, one green LED 7g, and one blue LED 7b. Light emitted from these three kinds of LEDs 7 hit a part of the back side of the liquid crystal panel 1. Note that the backlight 2 may include white LEDs instead of the LED units 6.

The backlight driving circuit 4 is a circuit for driving the backlight 2. On the basis of the LED data X3 output by the area-active driving processing section 13, the backlight driving circuit 4 outputs signals (voltage or current signals) for controlling luminances of the LEDs 7 to the backlight 2. Luminances of the LEDs 7 are controlled independently of luminances of the LEDs 7 included in the other LED units 6.

The unit screen of the display 11 is divided into (p×q) areas. Each area is associated with one LED unit 6. The area-active driving processing section 13 determines, for each of the (p×q) areas, on the basis of the input image data X1 for the area, luminances of the LEDs 7 included in the LED unit 6 corresponding to the area. The area-active driving processing section 13 determines luminances of all the LEDs 7 included in the backlight 2 and outputs the LED data X3 representing the determined luminances to the backlight driving circuit 4. Although each area is associated with one LED unit 6 herein, each area may be associated with multiple LED units 6.

The area-active driving processing section 13 also determines, on the basis of the LED data X3, luminances of backlight light at all the display elements 5 included in the liquid crystal panel 1. Further, the area-active driving processing section 13 determines light transmittances of all the display elements 5 included in the liquid crystal panel 1 on the basis of the input image data X1 and the luminances of the backlight light, and outputs the liquid crystal data X2 which contains pixel tone levels corresponding to the determined light transmittances to the panel driving circuit 3.

In the display 11, the luminance of each R display element is denoted by the product of the luminance of red light emitted by the backlight 2 and the light transmittance of the R display element. Light emitted by one red LED 7r hits multiple areas around one corresponding area. Thus, the luminance of each R display element is denoted by the product of the total luminance of light emitted by multiple red LEDs 7r and the light transmittance of the R display element. Similarly, the luminance of each G display element is denoted by the product of the total luminance of light emitted by multiple green LEDs 7g and the light transmittance of the G display element. The luminance of each B display element is denoted by the product of the total luminance of light emitted by multiple blue LEDs 7b and the light transmittance of the B display element.

On the basis of the input image data X1, the display 11 determines the liquid crystal data X2 and the LED data X3. The display 11 controls the light transmittances of the display elements 5 on the basis of the liquid crystal data X2 and controls the luminances of the LEDs 7 on the basis of the LED data X3. In this way, an image based on the input image data X1 can be displayed on the liquid crystal panel 1. Also, when the luminance in an area is low, the display 11 makes the luminance of the LEDs 7 associated with the area lower, thereby being able to reduce power consumption of the backlight 2. Also, when the luminance in an area is low, the display 11 switches the luminance of the display elements 5 associated with the area between a smaller number of levels, thereby being able to increase the resolution of the image and improve the quality of the displayed image.

The multi-display control section 12 is provided outside the nine displays 11. The multi-display control section 12 transmits and receives control information to and from the area-active driving processing sections 13 included in the corresponding displays 11 (details will be described later).

In the multi-display device 10, each of the displays 11 functions as an image display section and the multi-display control section 12 functions as a global control section. Also, each area-active driving processing section 13 functions as a local control section that is included in the corresponding image display section and performs area-active driving. Note that each panel driving circuit 3 and each backlight driving circuit 4 may be included in the corresponding local control section.

Figure 4:
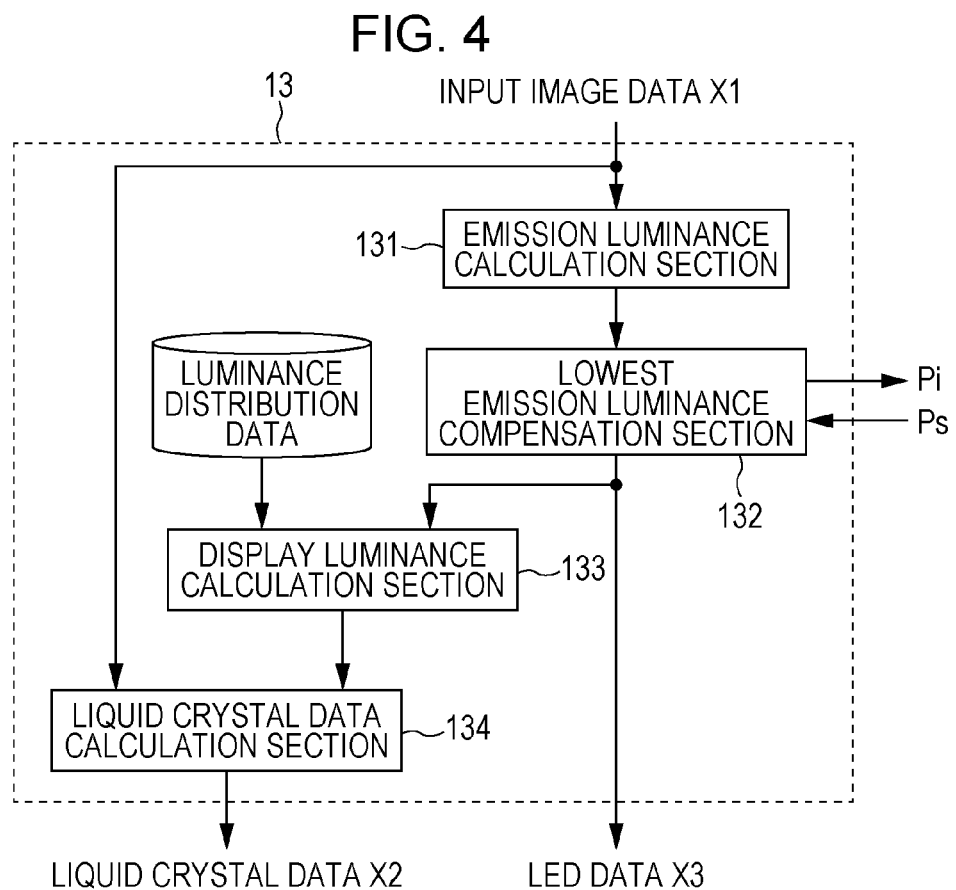
FIG. 4 is a block diagram illustrating details of an area-active driving processing section included in the multi-display device illustrated in FIG. 1.

FIG. 4 is a block diagram illustrating details of the area-active driving processing section 13. As illustrated in FIG. 4, the area-active driving processing section 13 includes an emission luminance calculation section 131, a lowest emission luminance compensation section 132, a display luminance calculation section 133, and a liquid crystal data calculation section 134. The area-active driving processing section 13 also stores luminance distribution data which represents a luminance distribution of light that has passed through the liquid crystal panel 1 after being emitted by the LED 7. In the following description, the luminance of light emitted by the LED 7 is referred to as emission luminance, whereas the luminance of light that has passed through the liquid crystal panel 1 after being emitted by the LED 7 is referred to as display luminance.

On the basis of the input image data X1, the emission luminance calculation section 131 determines emission luminances of all the LEDs 7 included in the backlight 2. More specifically, the emission luminance calculation section 131 determines, for each of the (p×q) areas, a statistical value of the input image data X1 in the area, and determines emission luminances of the LEDs 7 associated with the area on the basis of the determined statistical value. For example, the emission luminance calculation section 131 determines the maximum value of the input image data X1 in an area, and determines emission luminances of the LEDs 7 on the basis of the determined maximum value. Alternatively, the emission luminance calculation section 131 may determine an average value of the input image data X1 in an area, and may determine emission luminances of the LEDs 7 on the basis of the determined average value. Alternatively, the emission luminance calculation section 131 may determine the maximum value and the average value of the input image data X1 in an area, and may determine emission luminances of the LEDs 7 on the basis of these two values. The emission luminance calculation section 131 may set emission luminances of the three LEDs 7 included in one LED unit 6 to be the same value or may individually determine the emission luminances of the three LEDs 7.

The lowest emission luminance compensation section 132 corrects the emission luminances of the LEDs 7 determined by the emission luminance calculation section 131. More specifically, if the emission luminance of the LED 7 determined by the emission luminance calculation section 131 is smaller than a certain value (hereinafter, referred to as a lowest emission luminance compensation value Ps), the lowest emission luminance compensation section 132 corrects the emission luminance to the lowest emission luminance compensation value Ps. The lowest emission luminance compensation section 132 outputs the LED data X3 which contains the corrected emission luminances. The LED data X3 is output from the area-active driving processing section 13 to the backlight driving circuit 4 and is used in driving of the backlight 2. Details about an operation of the lowest emission luminance compensation section 132 will be described later.

On the basis of the LED data X3 and the luminance distribution data, the display luminance calculation section 133 determines a luminance distribution of the backlight 2. More specifically, the display luminance calculation section 133 determines, for all the display elements 5, the display luminances of the backlight light that has passed through the liquid crystal panel 1 with reference to the luminance distribution data by applying the corrected emission luminances determined by the lowest emission luminance compensation section 132. The display luminance calculation section 133 outputs display luminance data which contains display luminances at all the display elements 5.

On the basis of the input image data X1 and the display luminance data, the liquid crystal data calculation section 134 determines the liquid crystal data X2. More specifically, the liquid crystal data calculation section 134 determines light transmittances of the display elements 5 by diving each of (3m×n) pieces of data contained in the input image data X1 by a corresponding one of (3m×n) display luminances contained in the display luminance data. The liquid crystal data calculation section 134 converts the light transmittances of the display elements 5 into pixel tone levels of the display elements 5, and outputs the liquid crystal data X2 which contains the pixel tone levels of all the display elements 5. The liquid crystal data X2 is output from the area-active driving processing section 13 to the panel driving circuit 3 and is used in driving of the liquid crystal panel 1.

Figure 5:
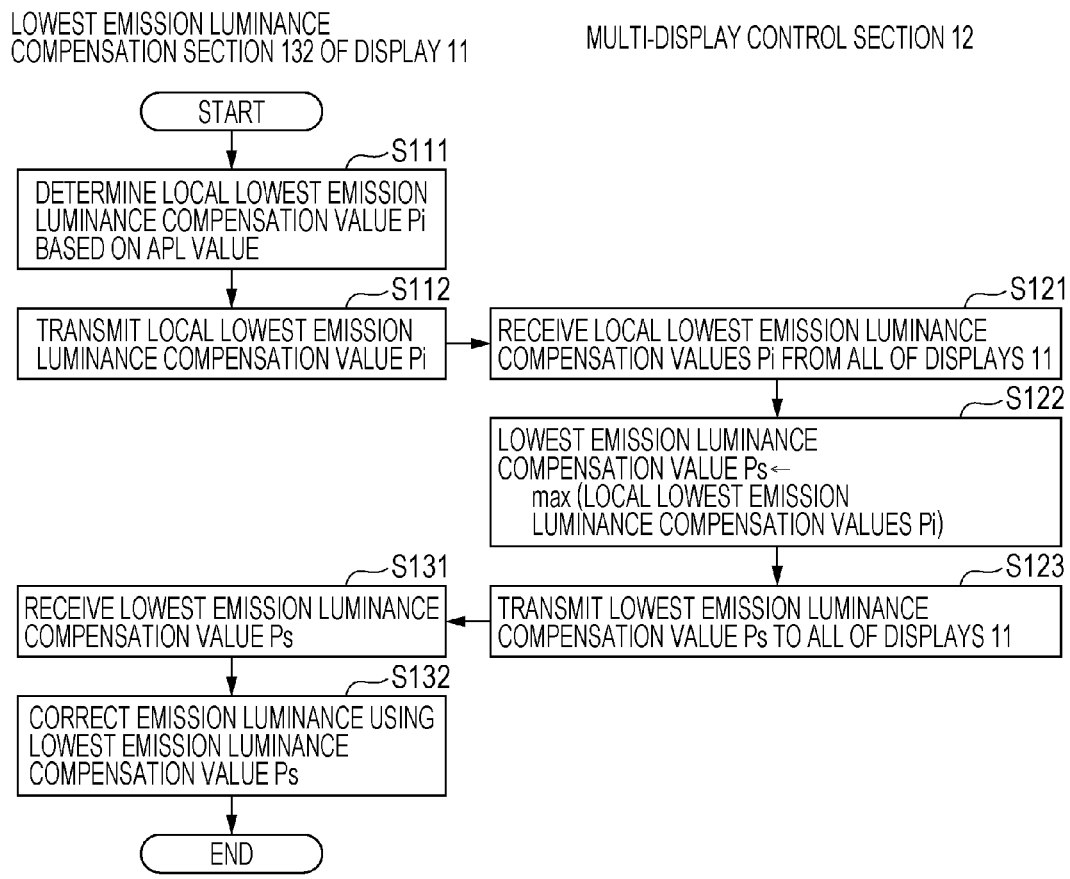
FIG. 5 is a flowchart illustrating operations of a lowest emission luminance compensation section and a multi-display control section included in the multi-display device illustrated in FIG. 1.

Referring to FIG. 5, details about an operation of the lowest emission luminance compensation section 132 will be described below. FIG. 5 is a flowchart illustrating operations of the lowest emission luminance compensation section 132 and the multi-display control section 12. First, each lowest emission luminance compensation section 132 determines a lowest emission luminance compensation value (hereinafter, referred to as a local lowest emission luminance compensation value Pi) of the corresponding display 11, as local control information which is control information used when area-active driving is performed individually (step S111). More specifically, the lowest emission luminance compensation section 132 receives, from the emission luminance calculation section 131, the emission luminances of all the LEDs 7 and an average luminance value (hereinafter, referred to as an APL (Average Picture Level) value) of the input image data X1 input to the corresponding display 11.

Figure 6:
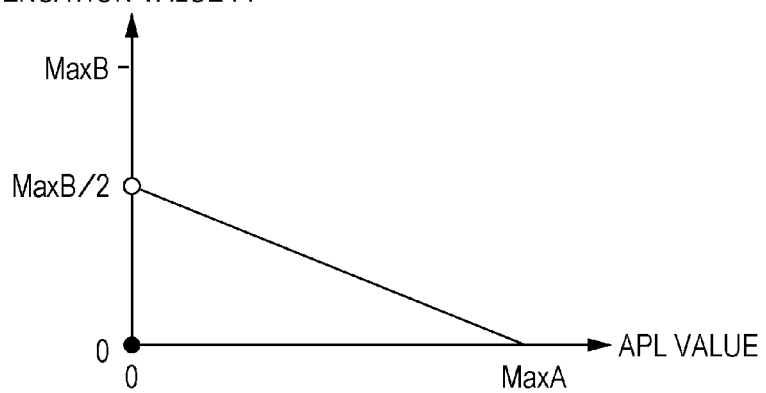
FIG. 6 is a diagram illustrating a relationship between an APL value and a local lowest emission luminance compensation value in the multi-display device illustrated in FIG. 1.

FIG. 6 is a diagram illustrating a relationship between the APL value and the local lowest emission luminance compensation value. In FIG. 6, the horizontal axis denotes the APL value, whereas the vertical axis denotes the local lowest emission luminance compensation value Pi. Also, MaxA and MaxB respectively denote the maximum APL value and the maximum emission luminance value of the LEDs 7. When the APL value output by the emission luminance calculation section 131 is A, the lowest emission luminance compensation section 132 determines the local lowest emission luminance compensation value Pi in accordance with Expression below.

$$Pi = -(MaxB/2MaxA) \times A + MaxB/2 \text{ (when } A \neq 0)$$

$$Pi = 0 \text{ (when } A = 0)$$

Even if the light transmittances of the display elements 5 are minimized, the liquid crystal panel 1 is unable to completely block the backlight light and lets a small amount of light pass therethrough. In the case where the input image data X1 contains a high-tone part, only the LEDs 7 associated with an area including the high-tone data emit high-luminance light in the display 11 that performs area-active driving. Thus, even if the light transmittances of the display elements 5 are made small in order to make the display screen dark, high-luminance light emitted by the LEDs 7 passes through the liquid crystal panel 1, possibly making part of the display screen brighter than it is supposed to be (this phenomenon is referred to as halo). As a method for making halo less conspicuous, there is known a method for reducing a difference between luminance of the backlight 2 in a high-tone region and luminance of the backlight 2 in a low-tone region. Images with low APL values include images whose tone levels are low as a whole but are high only partially. In such images, halo is likely to be conspicuous. Thus, as illustrated in FIG. 6, the smaller the APL value is, the larger the local lowest emission luminance compensation value Pi is made so as to increase the emission luminances of the LEDs 7 by a certain degree. In this way, it is possible to reduce a difference between luminance of the backlight 2 in a high-tone region and luminance of the backlight 2 in a low-tone region and to make halo less conspicuous.

Note that the lowest emission luminance compensation section 132 may determine the local lowest emission luminance compensation value Pi using a method other than the above one. For example, the area-active driving processing section 13 may include a table storing a relationship between the APL value and the local lowest emission luminance compensation value Pi, and the content of the table may be rewritten by an external device of the display 11.

Then, each lowest emission luminance compensation section 132 transmits the local lowest emission luminance compensation value Pi determined in step S111 to the multi-display control section 12 (step S112). The multi-display control section 12 receives the local lowest emission luminance compensation values P1 to P9 from the lowest emission luminance compensation sections 132 of all the displays 11 (step S121).

Then, on the basis of the local lowest emission luminance compensation values P1 to P9 received in step S121, the multi-display control section 12 determines the lowest emission luminance compensation value Ps for the entire multi-display device 10, as global control information which is control information used in the entire device (step S122). For example, the multi-display control section 12 determines the maximum value among the local lowest emission luminance compensation values P1 to P9 as the lowest emission luminance compensation value Ps because halo becomes less conspicuous as the lowest emission luminance compensation value Ps becomes larger. Note that the multi-display control section 12 may determine the lowest emission luminance compensation value Ps on the basis of the local lowest emission luminance compensation values P1 to P9 using a method other than the above one.

Then, the multi-display control section 12 transmits the lowest emission luminance compensation value Ps determined in step S122 to the lowest emission luminance compensation sections 132 of all the displays 11 (step S123). The lowest emission luminance compensation section 132 of each of the displays 11 receives the lowest emission luminance compensation value Ps from the multi-display control section 12 (step S131). Note that steps S112 to S131 are executed once during each frame period, for example, during vertical retrace periods of the nine displays 11 in synchronization.

Then, the lowest emission luminance compensation section 132 corrects the emission luminances of the LEDs 7 using the lowest emission luminance compensation value Ps received in step S131 (step S132). More specifically, if the emission luminance of the LED 7 determined by the emission luminance calculation section 131 is smaller than the lowest emission luminance compensation value Ps, the lowest emission luminance compensation section 132 corrects the emission luminance to the lowest emission luminance compensation value Ps.

As described above, in the multi-display device 10, each of the lowest emission luminance compensation sections 132 determines its local lowest emission luminance compensation value Pi on the basis of the APL value of an input image, and transmits the local lowest emission luminance compensation value Pi to the multi-display control section 12. The multi-display control section 12 determines the lowest emission luminance compensation value Ps on the basis of the local lowest emission luminance compensation values P1 to P9 received from the lowest emission luminance compensation sections 132, and transmits the lowest emission luminance compensation value Ps to the lowest emission luminance compensation sections 132 of all the displays 11. On the basis of the lowest emission luminance compensation value Ps received from the multi-display control section 12, each of the lowest emission luminance compensation sections 132 corrects the emission luminances of the LEDs 7. In this way, in the multi-display device 10, the emission luminances of the LEDs 7 are corrected using the same lowest emission luminance compensation value Ps in all the displays 11.

The following describes an advantageous effect provided by the multi-display device 10 according to the present embodiment in comparison with a multi-display device (hereinafter, referred to as a conventional multi-display device) which does not include the multi-display control section and in which nine displays perform area-active driving independently of one another. It is assumed in the following description that the highest tone level contained in the input image data X1 is 255 and the emission luminances of the LEDs 7 can be controlled in 256 steps. Also, the nine displays 11 are referred to as displays D1 to D9 as illustrated in FIG. 1.

FIGS. 7A to 7E are diagrams for describing an advantageous effect provided by the multi-display device 10. Herein, cases where the conventional multi-display device and the multi-display device 10 display an image illustrated in FIG. 7A are compared. The image illustrated in FIG. 7A includes a small region having a tone level of 255 (hereinafter, referred to as a white frame) in a background part having a tone level of 0.

Lowest emission luminance compensation sections of the conventional multi-display device determine local lowest emission luminance compensation values by using the same method as the lowest emission luminance compensation sections 132. The APL values are 0 in the displays D1, D4, and D7 and are slightly larger than 0 in the displays D2, D3, D5, D6, D8, and D9. Accordingly, the local lowest emission luminance compensation values are 0 in the displays D1, D4, and D7 and are 128 in the displays D2, D3, D5, D6, D8, and D9 (see FIG. 7B). Note that the local lowest emission luminance compensation value indicates the minimum luminance value of the backlight included in each display. The luminance of the backlight in an area included in the white frame is based the tone level of the white frame, that is, 255.

Each liquid crystal data calculation section sets the tone level of liquid crystal data of the background part to be 0. In the displays D1, D4, and D7, the tone level of the liquid crystal data is 0 and the luminance of the backlight is also 0. Thus, in the displays D1, D4, and D7, there is no backlight light that passes through a liquid crystal panel and the tone level of the unit screens is 0 (see FIG. 7C). In contrast, in the displays D2, D3, D5, D6, D8, and D9, the tone level of the liquid crystal data is 0 but the luminance of the backlight is 128. Thus, part of the backlight light passes through the liquid crystal panel. As a result, in the displays D2, D3, D5, D6, D8, and D9, the tone level of the background part on the unit screen becomes higher than 0, and thus the background part is not completely black (this phenomenon is called impure black). As a result, a luminance difference or chromaticity difference occurs among unit screens of the displays, decreasing the quality of an image displayed on the entire screen of the multi-display device.

In contrast, in the multi-display device 10 according to the present embodiment, the lowest emission luminance compensation section 132 and the multi-display control section 12 perform the operation illustrated in FIG. 5. Through this operation, the maximum value among the nine values illustrated in FIG. 7B, that is, 128, is determined as the lowest emission luminance compensation value Ps. Also, in all the displays D1 to D9, emission luminances of the backlights 2 (emission luminances of the LEDs 7) are corrected on the basis of the same lowest emission luminance compensation value which is 128 (see FIG. 7D). Accordingly, the emission luminances of the backlights 2 of the displays D1, D4, and D7 are 128, which is the same as those of the displays D2, D3, D5, D6, D8, and D9. That is, the luminances of the unit screens of the displays D1, D4, and D7 are the same as the luminances of the background parts displayed on the unit screens of the displays D2, D3, D5, D6, D8, and D9 (see FIG. 7E). Therefore, it is possible to prevent a luminance difference or chromaticity difference from occurring among the unit screens of the displays 11 and to improve the quality of an image displayed on the entire screen of the multi-display device 10.

As described above, the multi-display device 10 according to the present embodiment includes the nine displays 11 (a plurality of image display sections) each of which includes the liquid crystal panel 1 (a display panel), the backlight 2, and the area-active driving processing section 13 (a local control section) that performs area-active driving; and the multi-display control section 12 (a global control section) that transmits control information to and receives control information from the area-active driving processing sections 13. Each of the area-active driving processing sections 13 determines, as local control information, the local lowest emission luminance compensation value Pi, and transmits the local lowest emission luminance compensation value Pi to the multi-display control section 12. The multi-display control section 12 determines, as global control information, the lowest emission luminance compensation value Ps on the basis of the local lowest emission luminance compensation values P1 to P9 received from the area-active driving processing sections 13, and transmits the lowest emission luminance compensation value Ps to the area-active driving processing sections 13. Each of the area-active driving processing sections 13 corrects emission luminance of the backlight 2 on the basis of the lowest emission luminance compensation value Ps received from the multi-display control section 12.

As described above, in the multi-display device 10 according to the present embodiment, the area-active driving processing section 13 corrects the emission luminance of the backlight 2 on the basis of the lowest emission luminance compensation value Ps determined by the multi-display control section 12. In this way, the lowest emission luminances of the backlights 2 can be made equal in all the displays 11. Therefore, it is possible to prevent a luminance difference or chromaticity difference due to a difference between the lowest emission luminances of the backlights 2 from occurring among the unit screens of the displays 11 and to improve the quality of an image displayed on the multi-display device 10.

Also, the multi-display control section 12 transmits, to the area-active driving processing sections 13, the maximum value among the local lowest emission luminance compensation values P1 to P9 received from the area-active driving processing sections 13. In this way, the multi-display control section 12 can determine the lowest emission luminance compensation value Ps with which halo becomes less conspicuous. Also, each of the area-active driving processing sections 13 determines the local lowest emission luminance compensation value Pi to be transmitted to the multi-display control section 12, on the basis of the APL value of an input image. In this way, the area-active driving processing section 13 can determine the preferable local lowest emission luminance compensation value Pi on the basis of the average luminance level of the input image.

In the present embodiment, the area-active driving processing section 13 determines the local lowest emission luminance compensation value Pi as the local control information, and the multi-display control section 12 determines the lowest emission luminance compensation value Ps as the global control information. Instead of this, the area-active driving processing section may determine, as the local control information, information related to backlight luminance control other than the local lowest emission luminance compensation value Pi, and the multi-display control section may determine the global control information corresponding to the information. In a multi-display device configured in this manner, each area-active driving processing section controls the luminance of the backlight on the basis of the global control information determined by the multi-display control section. In this way, the luminances of the backlights can be controlled on the basis of the same control information in all the displays. Therefore, it is possible to prevent a luminance difference or chromaticity difference due to a difference in backlight luminance control from occurring among the display screens of the displays and to improve the quality of an image displayed on the multi-display device.

For example, examples of information related to backlight luminance control include a luminance scaling value. The luminance scaling value is a value that is multiplied by emission luminance of the backlight (emission luminances of LEDs). When the luminance scaling value differs among multiple displays, issues similar to those that occur in the case where the lowest emission luminance compensation value differs among multiple displays occur in the multi-display device.

Accordingly, each area-active driving processing section determines, as the local control information, a local luminance scaling value on the basis of input image data, and transmits the determined local luminance scaling value to the multi-display control section. The local luminance scaling value is determined so as to become smaller as the APL value of the input image data becomes larger. For example, when the APL value is the minimum value, the local luminance scaling value is determined to be 1; when the APL value is the maximum value, the local luminance scaling value is determined to be a certain value (for example, 0.5) that is smaller than 1. The multi-display control section determines, as the global control information, a luminance scaling value on the basis of the local luminance scaling values received from all the area-active driving processing sections, and transmits the determined luminance scaling value to all the area-active driving processing sections. The multi-display control section determines, as the luminance scaling value, the minimum value among the received local luminance scaling values, for example. Each of the area-active driving processing sections multiplies the emission luminance of the backlight by the luminance scaling value received from the multi-display control section.

A multi-display device configured in this manner can control the luminances of the backlights on the basis of the same scaling value in all the displays. Therefore, it is possible to prevent a luminance difference or chromaticity difference due to a difference between luminance scaling values of the backlights from occurring among the display screens of the displays and to improve the quality of an image displayed on the multi-display device.

Second Embodiment

Figure 8:
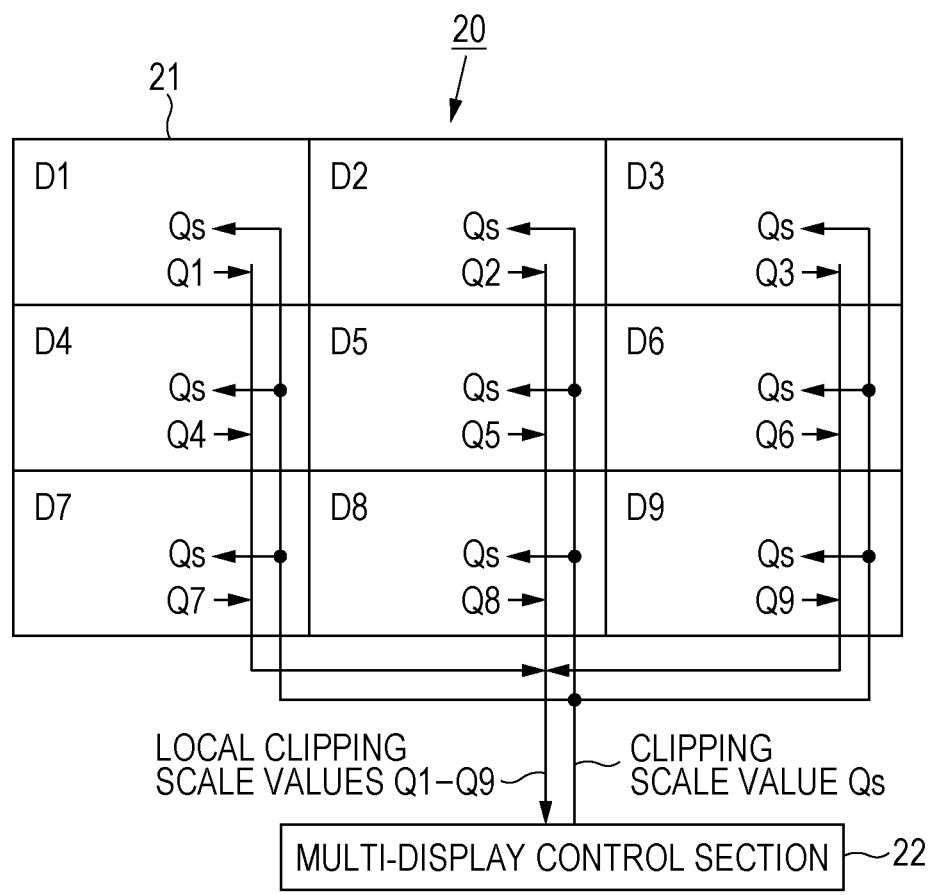
FIG. 8 is a block diagram illustrating the configuration of a multi-display device according to a second embodiment of the present invention.

FIG. 8 is a block diagram illustrating the configuration of a multi-display device according to a second embodiment of the present invention. A multi-display device 20 illustrated in FIG. 8 includes nine displays 21 and a multi-display control section 22. The displays 21 each have the configuration similar to that of the display 11 according to the first embodiment (see FIG. 2). Note that the displays 21 according to the present embodiment each include an area-active driving processing section 23 illustrated in FIG. 9 instead of the area-active driving processing section 13. Components similar to those of the first embodiment among components according to the present embodiment are denoted by the same reference numerals and a description thereof is omitted.

Figure 9:
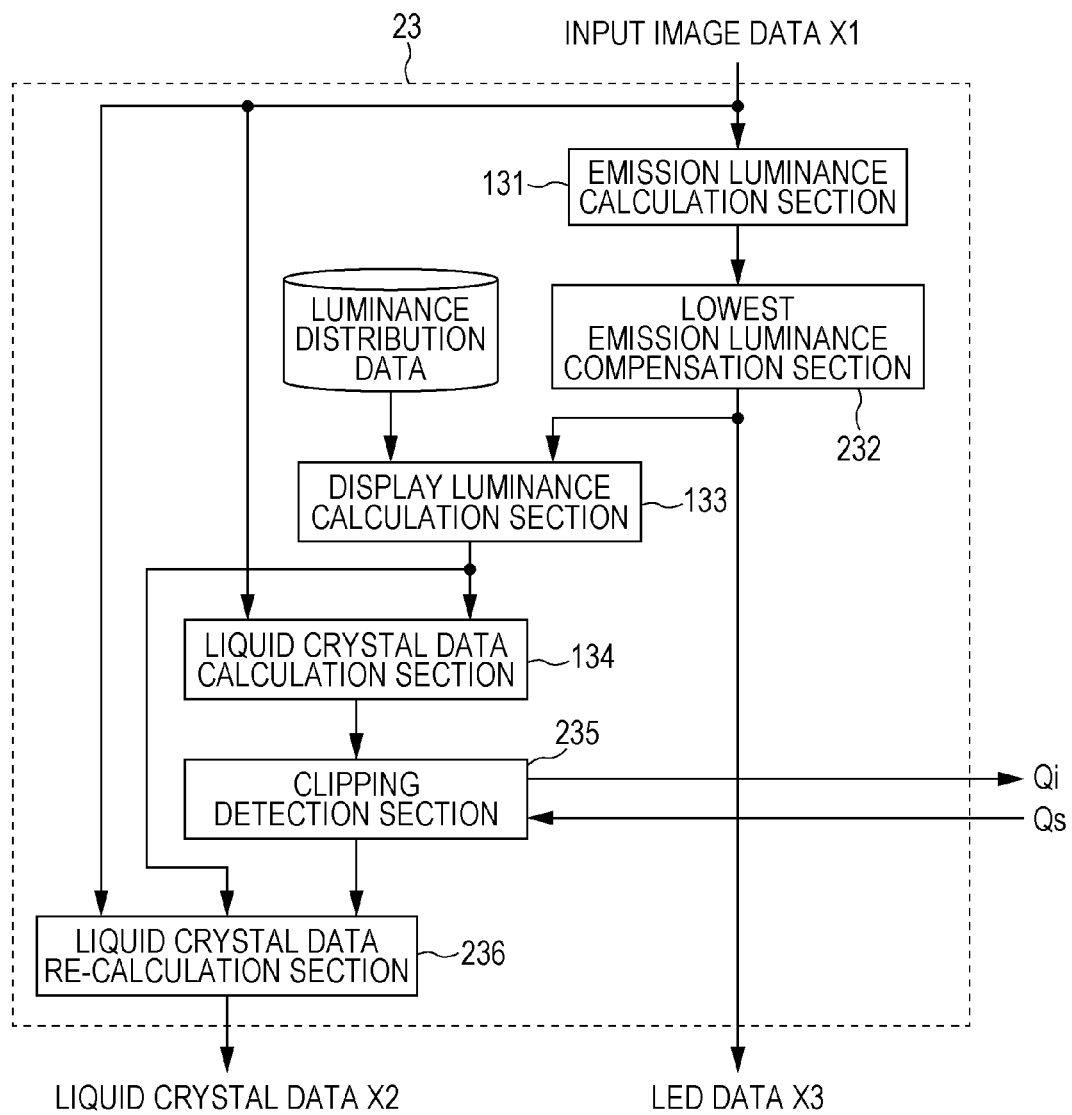
FIG. 9 is a block diagram illustrating details of an area-active driving processing section included in the multi-display device illustrated in FIG. 8.

FIG. 9 is a block diagram illustrating the configuration of the area-active driving processing section 23. As illustrated in FIG. 9, the area-active driving processing section 23 includes an emission luminance calculation section 131, a lowest emission luminance compensation section 232, a display luminance calculation section 133, a liquid crystal data calculation section 134, a clipping detection section 235, and a liquid crystal data re-calculation section 236. The area-active driving processing section 23 also stores luminance distribution data.

The emission luminance calculation section 131, the lowest emission luminance compensation section 232, the display luminance calculation section 133, and the liquid crystal data calculation section 134 operate in the same manner as in the first embodiment. Note that the lowest emission luminance compensation section 232 executes only steps S111 and S132 among steps illustrated in FIG. 5. In step S132, the lowest emission luminance compensation section 232 corrects emission luminances of LEDs 7 on the basis of a corresponding local lowest emission luminance compensation value Pi determined in step S111. Also, liquid crystal data determined by the liquid crystal data calculation section 134 is supplied to the clipping detection section 235 as temporary liquid crystal data.

In general, in a display that performs area-active driving, insufficient luminance of the backlight may make it impossible to correctly represent the highest tone level contained in input image data even if light transmittances of display elements are maximized. For example, even though the highest tone level contained in input image data is 255, the tone level may be represented only up to 240 on the display screen because of insufficient luminance of the backlight. When a pixel tone level of a display element determined by the liquid crystal data calculation section exceeds a maximum value (hereinafter, referred to as a maximum pixel tone level) of the representable pixel tone level, the determined pixel tone level is rounded to the maximum pixel tone level (this phenomenon is called clipping). When clipping occurs, gradation collapse in which tone levels that are originally different from one another are displayed in the same tone level occurs, decreasing the quality of a displayed image.

The clipping detection section 235 detects whether or not clipping occurs in the liquid crystal data determined by the liquid crystal data calculation section 134. The clipping detection section 235 obtains a value (hereinafter, referred to as a clipping scale value Qs) representing the degree of clipping, and outputs the clipping scale value Qs to the liquid crystal data re-calculation section 236. Details about an operation of the clipping detection section 235 will be described later.

The liquid crystal data re-calculation section 236 determines liquid crystal data X2 on the basis of input image data X1, display luminance data determined by the display luminance calculation section 133, and the clipping scale value Qs determined by the clipping detection section 235. More specifically, the liquid crystal data re-calculation section 236 divides each of (3m×n) pieces of data contained in the input image data X1 by a corresponding one of (3m×n) display luminances contained in the display luminance data, and further divides the results by the clipping scale value Qs so as to determine light transmittances of display elements 5. The liquid crystal data re-calculation section 236 converts the light transmittances of the display elements 5 into pixel tone levels of the display elements 5, and outputs the liquid crystal data X2 containing the pixel tone levels of all the display elements 5. The liquid crystal data X2 is output from the area-active driving processing section 23 to a panel driving circuit 3 and is used in driving of a liquid crystal panel 1. Alternatively, the liquid crystal data re-calculation section 236 may determine the liquid crystal data X2 on the basis of the temporary liquid crystal data determined by the liquid crystal data calculation section 134 and the clipping scale value Qs.

Figure 10:
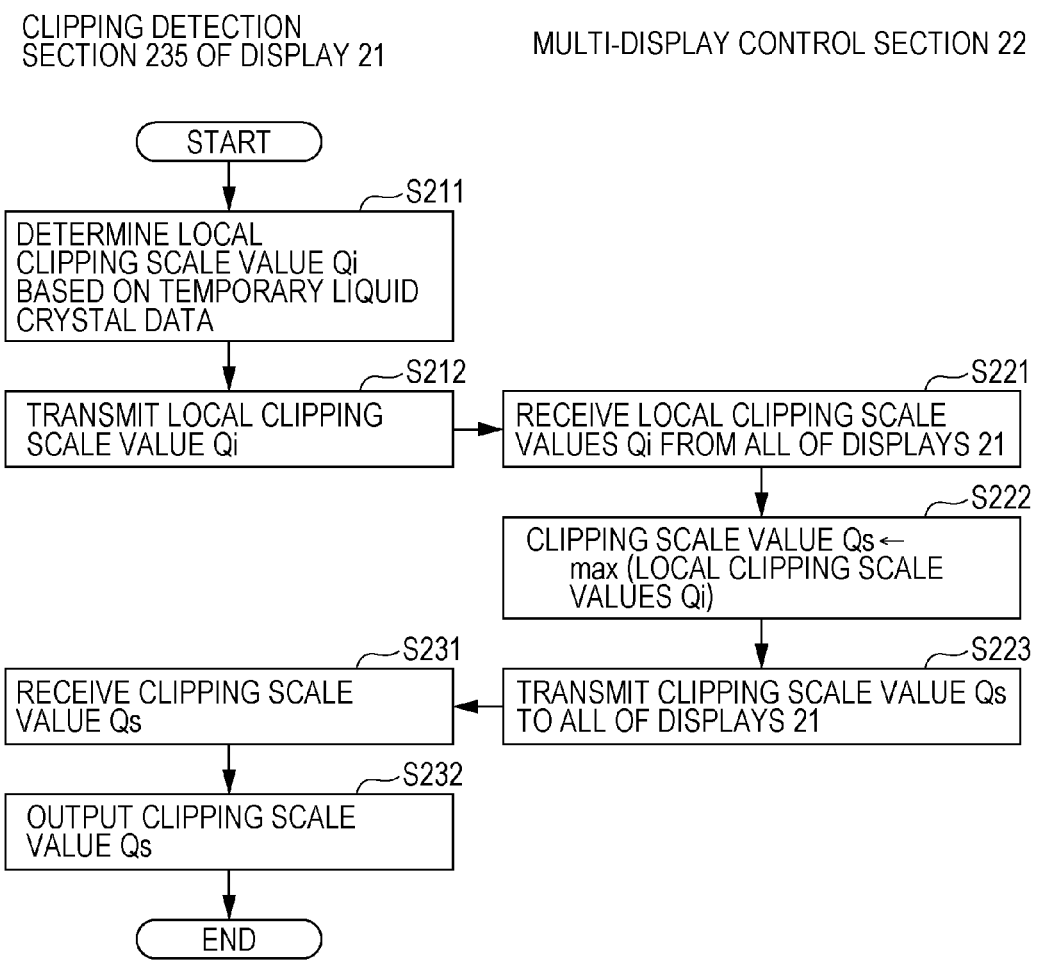
FIG. 10 is a flowchart illustrating operations of a clipping detection section and a multi-display control section included in the multi-display device illustrated in FIG. 8.

Referring to FIG. 10, details about the operation of the clipping detection section 235 will be described below. FIG. 10 is a flowchart illustrating operations of the clipping detection section 235 and the multi-display control section 22. First, each clipping detection section 235 determines, as local control information, a clipping scale value (hereinafter, referred to as a local clipping scale value Qi) of the corresponding display 21 on the basis of the temporary liquid crystal data determined by the liquid crystal data calculation section 134 (step S211). More specifically, the clipping detection section 235 determines, as the local clipping scale value Qi, a value obtained by dividing the highest value among pixel tone levels of the display elements 5 determined by the liquid crystal data calculation section 134 by the maximum pixel tone level. Note that the clipping detection section 235 may determine the local clipping scale value Qi using a method other than the above one.

Then, each clipping detection section 235 transmits the local clipping scale value Qi determined in step S211 to the multi-display control section 22 (step S212). The multi-display control section 22 receives the local clipping scale values Q1 to Q9 from the clipping detection sections 235 of all the displays 21 (step S221).

Then, the multi-display control section 22 determines, as global control information, the clipping scale value Qs for the entire multi-display device 20 on the basis of the local clipping scale values Q1 to Q9 received in step S221 (step S222). For example, the multi-display control section 22 determines, as the clipping scale value Qs, the maximum value among the local clipping scale values Q1 to Q9 because clipping is less likely to occur as the clipping scale value Qs becomes larger.

Note that the multi-display control section 22 may determine the clipping scale value Qs on the basis of the local clipping scale values Q1 to Q9 using a method other than the above one.

Then, the multi-display control section 22 transmits the clipping scale value Qs determined in step S222 to the clipping detection sections 235 of all the displays 21 (step S223). The clipping detection section 235 of each of the displays 21 receives the clipping scale value Qs from the multi-display control section 22 (step S231). Then, the clipping detection section 235 outputs the clipping scale value Qs received in step S231 to the liquid crystal data re-calculation section 236 (step S232). Note that steps S212 to S231 are executed once during each frame period, for example, during vertical retrace periods of the nine displays 21 in synchronization.

As described above, in the multi-display device 20, each of the clipping detection sections 235 determines the local clipping scale value Qi on the basis of the temporary liquid crystal data, and transmits the local clipping scale value Qi to the multi-display control section 22. The multi-display control section 22 determines the clipping scale value Qs on the basis of the local clipping scale values Q1 to Q9 received from the clipping detection sections 235, and transmits the clipping scale value Qs to the clipping detection sections 235 of all the displays 21. Each of the clipping detection sections 235 outputs the clipping scale value Qs received from the multi-display control section 22 to the corresponding liquid crystal data re-calculation section 236. The liquid crystal data re-calculation section 236 determines the liquid crystal data X2 on the basis of the clipping scale value Qs. In this way, in the multi-display device 20, the liquid crystal data X2 is determined using the same clipping scale value Qs in all the displays 21.

The following describes an advantageous effect provided by the multi-display device 20 according to the present embodiment in comparison with the conventional multi-display device. FIGS. 11A to 11E are diagrams for describing an advantageous effect provided by the multi-display device 20. Herein, cases where the conventional multi-display device and the multi-display device 20 display an image illustrated in FIG. 11A are compared. The image illustrated in FIG. 11A includes a white frame having a tone level of 200 in a background part having a tone level of 32.

Clipping detection sections of the conventional multi-display device determine local clipping scale values by using the same method as the clipping detection sections 235. It is assumed herein that the local clipping scale values are 1 in the displays D1, D4, and D7 and are 1.2 in the displays D2, D3, D5, D6, D8 and D9 (see FIG. 11B). No clipping occurs in the displays D1, D4, and D7 but clipping occurs in the displays D2, D3, D5, D6, D8, and D9.

Each liquid crystal data re-calculation section divides each of pieces of data contained in the input image data by a corresponding one of display luminances contained in the display luminance data, and further divides the results by the local clipping scale value. Because the local clipping scale value is 1 in the displays D1, D4, and D7, the values do not change after the values are divided by the local clipping scale value. Accordingly, the tone level of 32 is correctly displayed on the unit screens of the displays D1, D4, and D7 (see FIG. 11C). In the displays D2, D3, D5, D6, D8, and D9, the local clipping scale value is 1.2. Thus, the values become smaller after the values are divided by the local clipping scale value. Consequently, a tone level lower than 32 (tone level of 32/1.2) and a tone level lower than 200 (tone level of 200/1.2) are displayed on the unit screens of the displays D2, D3, D5, D6, D8, and D9. As a result, a luminance difference or chromaticity difference occurs among the unit screens of the displays, decreasing the quality of an image displayed on the entire screen of the multi-display device.

In contrast, in the multi-display device 20 according to the present embodiment, the clipping detection section 235 and the multi-display control section 22 perform the operation illustrated in FIG. 10. Through this operation, the maximum value among the nine values illustrated in FIG. 11B, that is, 1.2, is determined as the clipping scale value Qs. Also, the liquid crystal data X2 is determined on the basis of the same clipping scale value which is 1.2 in all the displays D1 to D9 (see FIG. 11D). Accordingly, the liquid crystal data X2 for the displays D1, D4, ad D7 is obtained through division using the clipping scale value of 1.2 which is the same as that for the displays D2, D3, D5, D6, D8, and D9. That is, the luminances of the unit screens of the displays D1, D4, and D7 are the same as the luminances of the background parts displayed on the unit screens of the displays D2, D3, D5, D6, D8, and D9 (see FIG. 11E). Therefore, it is possible to prevent a luminance difference or chromaticity difference from occurring among the unit screens of the displays 21 and to improve the quality of an image displayed on the entire screen of the multi-display device 20.

As described above, the multi-display device 20 according to the present embodiment has a configuration similar to that of the multi-display device 10 according to the first embodiment. Each of the area-active driving processing sections 23 determines, as local control information, the local clipping scale value Qi, and transmits the local clipping scale value Qi to the multi-display control section 22. The multi-display control section 22 determines, as global control information, the clipping scale value Qs on the basis of the local clipping scale values Q1 to Q9 received from the area-active driving processing sections 23, and transmits the clipping scale value Qs to the area-active driving processing sections 23. Each of the area-active driving processing sections 23 determines the liquid crystal data X2 (display data) on the basis of the clipping scale value Qs received from the multi-display control section 22.

As described above, in the multi-display device 20 according to the present embodiment, each of the area-active driving processing sections 23 determines the liquid crystal data X2 on the basis of the clipping scale value Qs determined by the multi-display control section 22. In this way, the liquid crystal data X2 can be determined using the same clipping scale value Qs in all the displays 21. Therefore, it is possible to prevent a luminance difference or chromaticity difference due to a difference between the clipping scale values from occurring among the display screens of the displays 21 and to improve the quality of an image displayed on the multi-display device 20.

Also, the multi-display control section 22 transmits, to the area-active driving processing sections 23, the maximum value among the local clipping scale values Q1 to Q9 received from the area-active driving processing sections 23. In this way, the multi-display control section 22 can determine the clipping scale value Qs with which clipping is less likely to occur. Also, each of the area-active driving processing sections 23 determines the local clipping scale value Qi to be transmitted to the multi-display control section 22, on the basis of the temporary liquid crystal data (temporary display data) based on an input image. In this way, the area-active driving processing section 23 can determine the local clipping scale value Qi.

In the present embodiment, the area-active driving processing section 23 determines the local clipping scale value Qi as the local control information, and the multi-display control section 22 determines the clipping scale value Qs as the global control information. Instead of this, the area-active driving processing section may determine, as the local control information, information related to control of light transmittance of the liquid crystal panel other than the local clipping scale value Qi, and the multi-display control section may determine the global control information corresponding to the information. In a multi-display device configured in this manner, the area-active driving processing section controls light transmittance of the liquid crystal panel on the basis of the global control information determined by the multi-display control section. In this way, light transmittances of the liquid crystal panels can be controlled on the basis of the same control information in all the displays. Therefore, it is possible to prevent a luminance difference or chromaticity difference due to a difference in control of light transmittances of the liquid crystal panels from occurring among the display screens of the displays and to improve the quality of an image displayed on the multi-display device.

Third Embodiment

Figure 12:
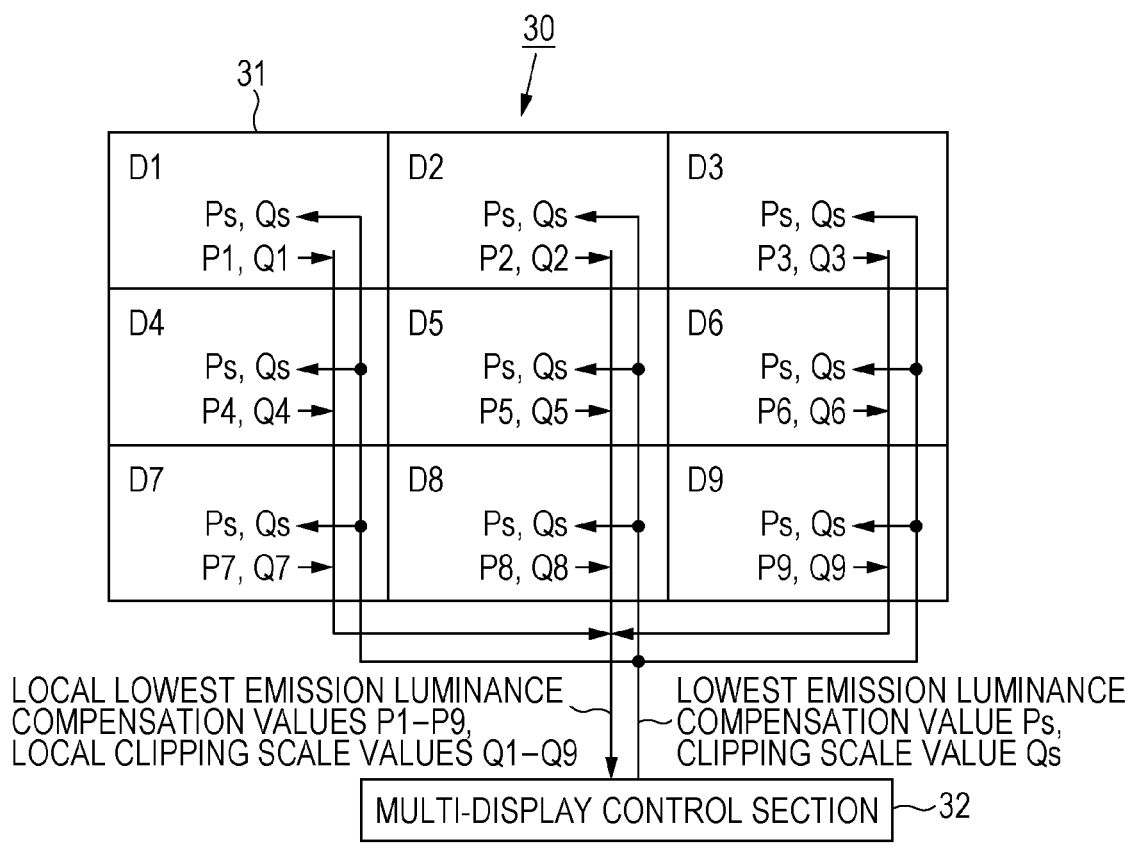
FIG. 12 is a block diagram illustrating the configuration of a multi-display device according to a third embodiment of the present invention.

FIG. 12 is a block diagram illustrating the configuration of a multi-display device according to a third embodiment of the present invention. A multi-display device 30 illustrated in FIG. 12 includes nine displays 31 and a multi-display control section 32. The displays 31 each have the configuration similar to that of the display 11 according to the first embodiment (see FIG. 2). Note that the displays 31 according to the present embodiment each include an area-active driving processing section 33 illustrated in FIG. 13 instead of the area-active driving processing section 13. Components similar to those of the first and second embodiments among components according to the present embodiment are denoted by the same reference numerals and a description thereof is omitted.

Figure 13:
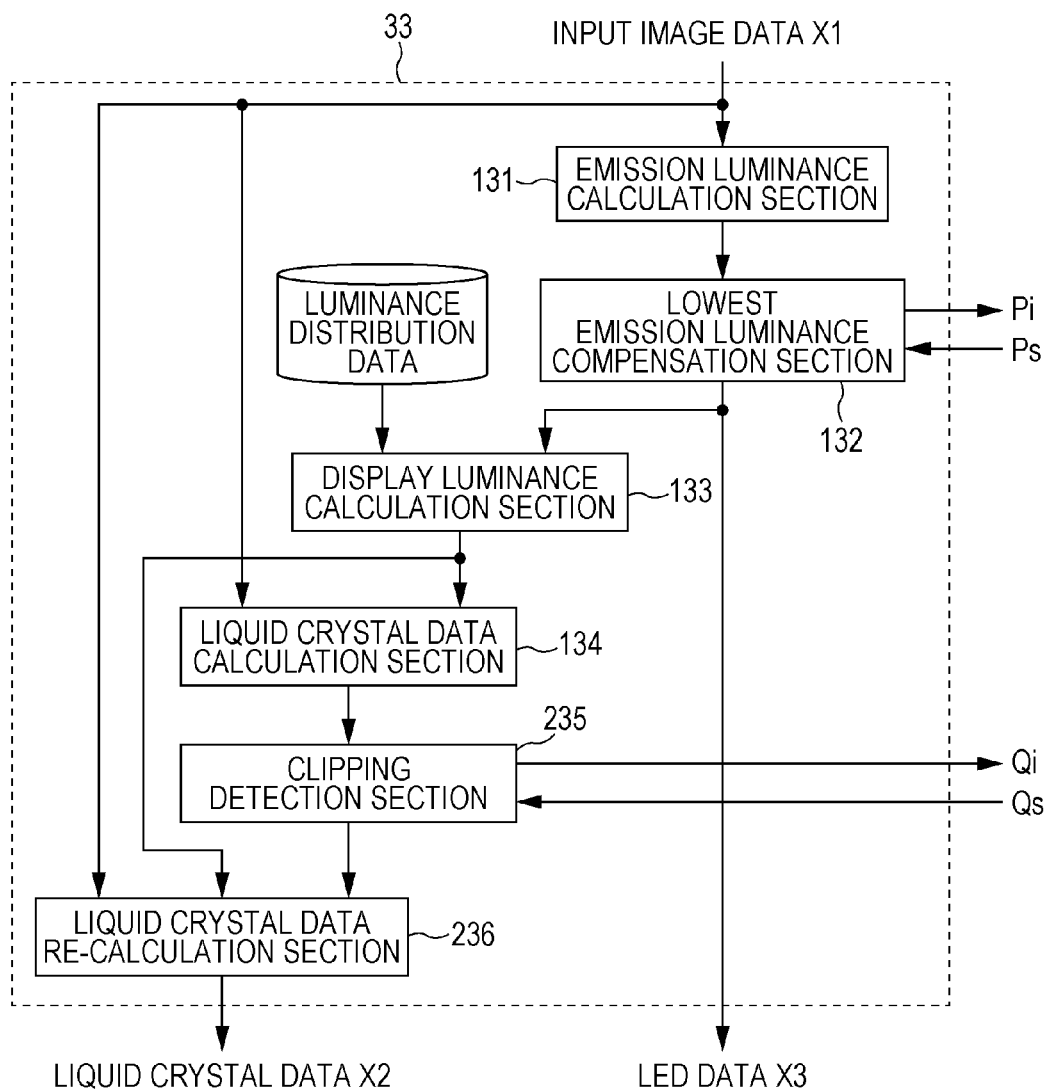
FIG. 13 is a block diagram illustrating details of an area-active driving processing section included in the multi-display device illustrated in FIG. 12.

FIG. 13 is a block diagram illustrating the configuration of the area-active driving processing section 33. As illustrated in FIG. 13, the area-active driving processing section 33 includes an emission luminance calculation section 131, a lowest emission luminance compensation section 132, a display luminance calculation section 133, a liquid crystal data calculation section 134, a clipping detection section 235, and a liquid crystal data re-calculation section 236. The area-active driving processing section 33 also stores luminance distribution data.

The emission luminance calculation section 131, the lowest emission luminance compensation section 132, the display luminance calculation section 133, and the liquid crystal data calculation section 134 operate in the same manner as in the first embodiment. The clipping detection section 235 and the liquid crystal data re-calculation section 236 operate in the same manner as in the second embodiment. The multi-display control section 32 performs both the operation of the multi-display control section 12 according to the first embodiment and the operation of the multi-display control section 22 according to the second embodiment. More specifically, the multi-display control section 32 first executes steps S121 to S123 (FIG. 5) and then executes steps S221 to S223 (FIG. 10).

As described above, the multi-display device 30 according to the present embodiment has a configuration similar to those of the multi-display devices 10 and 20 according to the first and second embodiments. Each of the area-active driving processing sections 33 determines, as local control information, the local lowest emission luminance compensation value Pi and the local clipping scale value Qi, and transmits the local lowest emission luminance compensation value Pi and the local clipping scale value Qi to the multi-display control section 32. The multi-display control section 32 determines, as global control information, the lowest emission luminance compensation value Ps and the clipping scale value Qs on the basis of the local lowest emission luminance compensation values P1 to P9 and the local clipping scale values Q1 to Q9 received from the area-active driving processing sections 33, and transmits the lowest emission luminance compensation value Ps and the clipping scale value Qs to the area-active driving processing sections 33. Each of the area-active driving processing sections 33 corrects the emission luminance of the backlight 2 on the basis of the lowest emission luminance compensation value Ps received from the multi-display control section 32 and also determines the liquid crystal data X2 on the basis of the clipping scale value Qs received from the multi-display control section 32.

As described above, in the multi-display device 30 according to the present embodiment, each of the area-active driving processing sections 33 corrects the emission luminance of the backlight 2 on the basis of the lowest emission luminance compensation value Ps determined by the multi-display control section 32 and also determines the liquid crystal data X2 on the basis of the clipping scale value Qs determined by the multi-display control section 32. Thus, in all the displays 31, the lowest emission luminances of the backlights 2 can be made equal and the liquid crystal data X2 can be determined using the same clipping scale value Qs. Therefore, it is possible to prevent a luminance difference or chromaticity difference due to a difference between the lowest emission luminance compensation values and the clipping scale values from occurring among the display screens of the displays 31 and to improve the quality of an image displayed on the multi-display device 30.

In the present embodiment, the area-active driving processing section 33 determines the local lowest emission luminance compensation value Pi and the local clipping scale value Qi as the local control information, and the multi-display control section 32 determines the lowest emission luminance compensation value Ps and the clipping scale value Qs as the global control information. Instead of this, the area-active driving processing section may determine, as the local control information, information related to backlight luminance control other than the local lowest emission luminance compensation value Pi and information related to control of light transmittance of the liquid crystal panel other than the local clipping scale value Qi, and the multi-display control section may determine the global control information corresponding to these pieces of information. In a multi-display device configured in this manner, the area-active driving processing section controls luminance of the backlight and light transmittance of the liquid crystal panel on the basis of the global control information determined by the multi-display control section. In this way, luminances of the backlights can be controlled on the basis of the same control information and light transmittances of the liquid crystal panels can be controlled on the basis of the same control information in all the displays. Therefore, it is possible to prevent a luminance difference or chromaticity difference due to a difference in control of luminances of the backlights and control of light transmittances of the liquid crystal panels from occurring among the display screens of the displays and to improve the quality of an image displayed on the multi-display device.

Although, in the first to third embodiments, the multi-display control section is provided outside the displays, the multi-display control section may be included in each of the displays. In this case, a method for causing only one of a plurality of multi-display control sections included in a plurality displays to operate and a method for causing the plurality of multi-display control sections to operate are conceived. In order to implement the former method, a setting may be made so that only one of the plurality of multi-display control sections to operate and the rest do not operate. In order to implement the latter method, the plurality of multi-display control sections are caused to operate in cooperation with each other so as to provide the same functions as the multi-display control sections according to the first to third embodiments.

INDUSTRIAL APPLICABILITY

Image display devices based on the present invention have features that prevent a luminance difference or chromaticity difference from occurring among display screens of image display sections and that can improve the quality of a displayed image, and thus can be utilized as various image display devices of multi-display type, such as an image display device including a plurality of liquid crystal displays.

REFERENCE SIGNS LIST

1 . . . liquid crystal panel
2 . . . backlight
3 . . . panel driving circuit
4 . . . backlight driving circuit
5 . . . display element
6 . . . LED unit
7 . . . LED
10, 20, 30 . . . multi-display device
11, 21, 31 . . . display
12, 22, 32 . . . multi-display control section
13, 23, 33 . . . area-active driving processing section
131 . . . emission luminance calculation section
132, 232 . . . lowest emission luminance compensation section
133 . . . display luminance calculation section
134 . . . liquid crystal data calculation section
235 . . . clipping detection section
236 . . . liquid crystal data re-calculation section

The invention claimed is:

1. An image display device of multi-display type, comprising:
a plurality of image display sections each including a display panel, a backlight, and a local controller configured or programmed to perform area-active driving; and
a global controller configured or programmed to transmit and receive control information to and from the local controllers, wherein:
the local controllers each determine local control information and transmit the local control information to the global controller,
the local control information being control information used when area-active driving is performed individually,
the global controller determines global control information on the basis of the local control information received from the local controllers and transmits the global control information to the local controllers,
the global control information being control information for the entire device,
the local controllers each operate on the basis of the global control information received from the global controller,
the local control information and the global control information each include information related to control of light transmittance of the display panel, the local control information and the global control information each include information related to control of luminance of the backlight, the local control information and the global control information each include a lowest emission luminance compensation vane which indicates the lowest luminance of light to be emitted by the backlight, the local controllers correct luminance of light to be emitted by the backlight on the basis of the lowest emission luminance compensation value received from the global controller, and the global controller transmits, to the local controllers, the maximum vane among the lowest emission luminance compensation values received from the local controllers.

2. The image display device according to claim 1, wherein the local controllers each determine, on the basis of an average luminance level of an input image, the lowest emission luminance compensation value to be transmitted to the global controller.

3. The image display device according to claim 1, wherein:
the local control information and the global control information each include a clipping scale value which indicates a degree of clipping that occurs in display data for use in driving of the display panel, and the local controllers each determine the display data on the basis of the clipping scale value received from the global controller.

4. The image display device according to claim 3, wherein the global controller transmits, to the local controllers, the maximum value among the clipping scale values received from the local controllers.

5. The image display device according to claim 3, wherein the local controllers each determine, on the basis of temporary display data based on an input image, the clipping scale value to be transmitted to the global controller.

6. An image display device of multi-display type, comprising:
a plurality of image display sections each including a display panel, a backlight, and a local controller configured or programmed to perform area-active driving; and a global controller configured or programmed to transmit and receive control information to and from the local controllers, wherein:

the local controllers each determine local control information and transmit the local control information to the global controller, the local control information is control information used when area-active driving is performed individually, the global controller determines global control information on the basis of the local control information received from the local controllers and transmits the global control information to the local controllers, the global control information is control information for the entire device, the local controllers each operate on the basis of the global control information received from the global controller, and the global controller transmits, to the local controllers, a maximum value among lowest emission luminance compensation values received from the local controllers.

7. The image display device according to claim 6, wherein the local control information and the global control information each include information related to control of luminance of the backlight.

8. The image display device according to claim 7, wherein:
the local control information and the global control information each include a lowest emission luminance compensation value which indicates the lowest luminance of light to be emitted by the backlight, and the local controllers each correct luminance of light to be emitted by the backlight on the basis of the lowest emission luminance compensation value received from the global controller.

9. The image display device according to claim 8, wherein the local controllers each determine, on the basis of an average luminance level of an input image, the lowest emission luminance compensation value to be transmitted to the global controller.

10. The image display device according to claim 6, wherein the local control information and the global control information each include information related to control of light transmittance of the display panel.

11. The image display device according to claim 10, wherein:
the local control information and the global control information each include a clipping scale value which indicates a degree of clipping that occurs in display data used in driving of the display panel, and the local controllers each determine the display data on the basis of the clipping scale value received from the global controller.

12. The image display device according to claim 11, wherein
the global controller transmits, to the local controllers, the maximum value among the clipping scale values received from the local controllers.

13. The image display device according to claim 11, wherein
the local controllers each determine, on the basis of temporary display data based on an input image, the clipping scale value to be transmitted to the global controller.

14. The image display device according to claim 6, wherein the local control information and the global control information each include both information related to control of luminance of the backlight and information related to control of light transmittance of the display panel.

* * * * *